(12) United States Patent
Keller et al.

(10) Patent No.: US 10,853,091 B2
(45) Date of Patent: Dec. 1, 2020

(54) CLOUD TO ON-PREMISES WINDOWS REGISTRY SETTINGS

(71) Applicant: Citrix Systems, Inc., Fort Lauderdale, FL (US)

(72) Inventors: Steven A. Keller, Coral Springs, FL (US); Joel Kevin Lawrence Cardoza, Seattle, WA (US); Thomas Michael Kludy, Cooper City, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 71 days.

(21) Appl. No.: 15/652,937

(22) Filed: Jul. 18, 2017

(65) Prior Publication Data

US 2019/0026124 A1     Jan. 24, 2019

(51) Int. Cl.
   *G06F 9/44*             (2018.01)
   *G06F 9/445*           (2018.01)
   *H04L 29/08*          (2006.01)

(52) U.S. Cl.
CPC .......... *G06F 9/44505* (2013.01); *H04L 67/02* (2013.01); *H04L 67/34* (2013.01)

(58) Field of Classification Search
CPC ..... H04L 41/18; H04L 41/00; H04L 41/0893; H04L 29/06; H04L 67/125; H04L 63/08; H04L 67/02; H04L 67/34; H04L 29/12301; H04W 88/182; G06F 16/2379; G06F 16/958; G06F 21/6218; G06F 8/65; G06F 21/53; G06F 8/64; G06F 9/44505
See application file for complete search history.

(56) References Cited

U.S. PATENT DOCUMENTS

| | | | | |
|---|---|---|---|---|
| 5,790,809 A | * | 8/1998 | Holmes | H04L 29/06 370/466 |
| 6,029,246 A | * | 2/2000 | Bahr | G06F 21/6218 709/202 |
| 6,157,941 A | * | 12/2000 | Verkler | H04W 88/182 709/202 |
| 6,484,257 B1 | * | 11/2002 | Ellis | H04L 63/08 713/153 |
| 7,035,895 B1 | * | 4/2006 | Hooper | H04L 41/00 709/201 |
| 7,225,249 B1 | * | 5/2007 | Barry | H04L 41/18 709/227 |
| 2005/0027846 A1 | * | 2/2005 | Wolfe | G06F 8/64 709/223 |

(Continued)

*Primary Examiner* — Tuan A Vu
(74) *Attorney, Agent, or Firm* — Foley & Lardner LLP (57) ABSTRACT

Described embodiments provide systems and methods for stateless modification of operating system registry data across network boundaries. The system includes a processor coupled to memory and configured to execute instructions to receive, within a first network, a request to apply a modification to an operating system registry of a second device within a second network different from the first network. The processor queues data describing the requested modification, receives a polling request from the second device, and transmits, to the second device responsive to the polling request, the queued data describing the requested modification for the second device to apply to the operating system registry of the second device. For example, the requested modification may be to create a key, to create a value, to delete a key, or to delete a value.

20 Claims, 5 Drawing Sheets

(56) References Cited

U.S. PATENT DOCUMENTS

| | | | | |
|---|---|---|---|---|
| 2005/0235280 | A1* | 10/2005 | Le | G06F 8/65 717/173 |
| 2006/0174319 | A1* | 8/2006 | Kraemer | G06F 21/53 726/1 |
| 2008/0140820 | A1* | 6/2008 | Snyder | H04L 67/125 709/223 |
| 2008/0235708 | A1* | 9/2008 | Lopez | G06F 16/958 719/311 |
| 2015/0207683 | A1* | 7/2015 | Adogla | H04L 41/0893 709/223 |
| 2016/0070747 | A1* | 3/2016 | Pottlapelli | G06F 16/2379 707/703 |

* cited by examiner

CLOUD TO ON-PREMISES WINDOWS REGISTRY SETTINGS

BACKGROUND

The Microsoft Windows Registry is a data manager native to the operating system and used by the kernel to store operating system configuration settings. The registry can also be used by device drivers, utilities, and installed applications. The registry is structured as a hierarchy of keys. Each key may contain additional keys, and the keys can act as a path to values represented as name and data pairs. The named values are accessible via the corresponding key path.

The Windows registry may be modified via an application programming interface ("API"). For example, there are API calls to create or delete registry keys and to read, create, modify, and delete registry values within registry keys. Modifying a registry can present significant risk to the stability of an operating system setup. The operating system relies on the integrity of the registry. Accordingly, the registry can only be modified locally or by a local administrator on premises (e.g., within the same network) using remote procedure calls ("RPC"). These approaches are inadequate for remote system management.

Network accessible computing systems, e.g., servers in a data center, provide various services over a network (e.g., the Internet). These systems are sometimes referred to as "cloud based" or "in the cloud" in reference to their off-premises location within the network (which is often depicted in figures as a cloud). Some service architectures are designed to incorporate certain features to accomplish representational state transfer ("REST"). A REST service (or "RESTful" service) provide clients a uniform and predefined set of stateless operations. The stateless aspect allows such services to scale to a large number of servers handling client requests.

A computing device (e.g., a server) provides services to other computing devices (e.g., a client) in a network by accepting network communications (e.g., packets) addressed to the server where the received communication is handled by a process (e.g., a service daemon) executed by the computing device. The process obtains the received communication by monitoring ("listening on") a communication port specific to the process or specific to a protocol used by the process. Generally, transport layer protocols include a field for designating a destination communication port by port number.

Typically, a service listens on a port assigned to the service or a port assigned to a protocol associated with the service. The Internet Assigned Numbers Authority ("IANA") maintains a "Service Name and Transport Protocol Port Number Registry" assigning specific port numbers to various transport protocols. For example, the Hypertext Transport Protocol ("HTTP") uses port 80. However, service processes may actually use any port, or multiple ports, including unassigned ports. For example, a developer of a new service or a custom service might request registration (with IANA) of one or more unassigned port numbers.

Network service providers can (and do) either restrict communications to only allow communication to a set of authorized ports (a "white list") or to block communication to a set of prohibited ports (a "black list"), e.g., using a firewall. This restriction effectively blocks access to a service that listens on a port that is not in a set of authorized ports (or inversely is in a set of prohibited ports). A computing device running a service that listens on a blocked port behind such a firewall cannot be reached by clients beyond the firewall. However, because firewalls generally allow internal devices to send data communications on any port, and allow external devices to respond to those data communications on the same port, a computing device behind a firewall might listen to blocked ports for responses to communications initiated at the computing device. This is known as "piercing" the firewall. However, this requires the device behind the firewall to initiate the communication, which a service generally doesn't do. Instead, a process might listen for new session requests on a first port (e.g., port 80 for session requests established using HTTP) and respond with instructions to a client to use a different port (e.g., port 81). The client then pierces the firewall on the second port. Firewall restrictions can be particularly problematic for applications deployed behind a firewall.

These and other technical problems are addressed by the subject matter described.

SUMMARY

This Summary is provided to introduce a selection of concepts in a simplified form that are further described below in the Detailed Description. This Summary is not intended to identify key features or essential features, nor is it intended to limit the scope of the claims included herewith.

In at least one aspect, described is a method for stateless modification of operating system registry data across network boundaries. The method includes receiving, by a processor within a first network, a request to apply a modification to an operating system registry of a second device within a second network different from the first network. The method includes queueing, by the processor, data describing the requested modification. The method includes receiving, by the processor, a polling request from the second device. And the method includes transmitting, by the processor to the second device responsive to the polling request, the queued data describing the requested modification for the second device to apply to the operating system registry of the second device.

In at least one aspect, described is a system for stateless modification of operating system registry data across network boundaries. The system includes a processor coupled to memory and configured to execute instructions to receive, within a first network, a request to apply a modification to an operating system registry of a second device within a second network different from the first network. The processor is configured to execute instructions to queue data describing the requested modification, receive a polling request from the second device, and transmit, to the second device responsive to the polling request, the queued data describing the requested modification for the second device to apply to the operating system registry of the second device.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

The subject matter described covers topics that, among other things, enables operating system and secured configurations, such as Microsoft Windows registry settings, to be set via a cloud-service RESTful API. This enables the registry of a computing device in a first network to be configured remotely, e.g., from a second network. For example, as described herein, the on-premises registry settings may be set from a remote (off-site) machine via a remote cloud service.

Figure 1A:
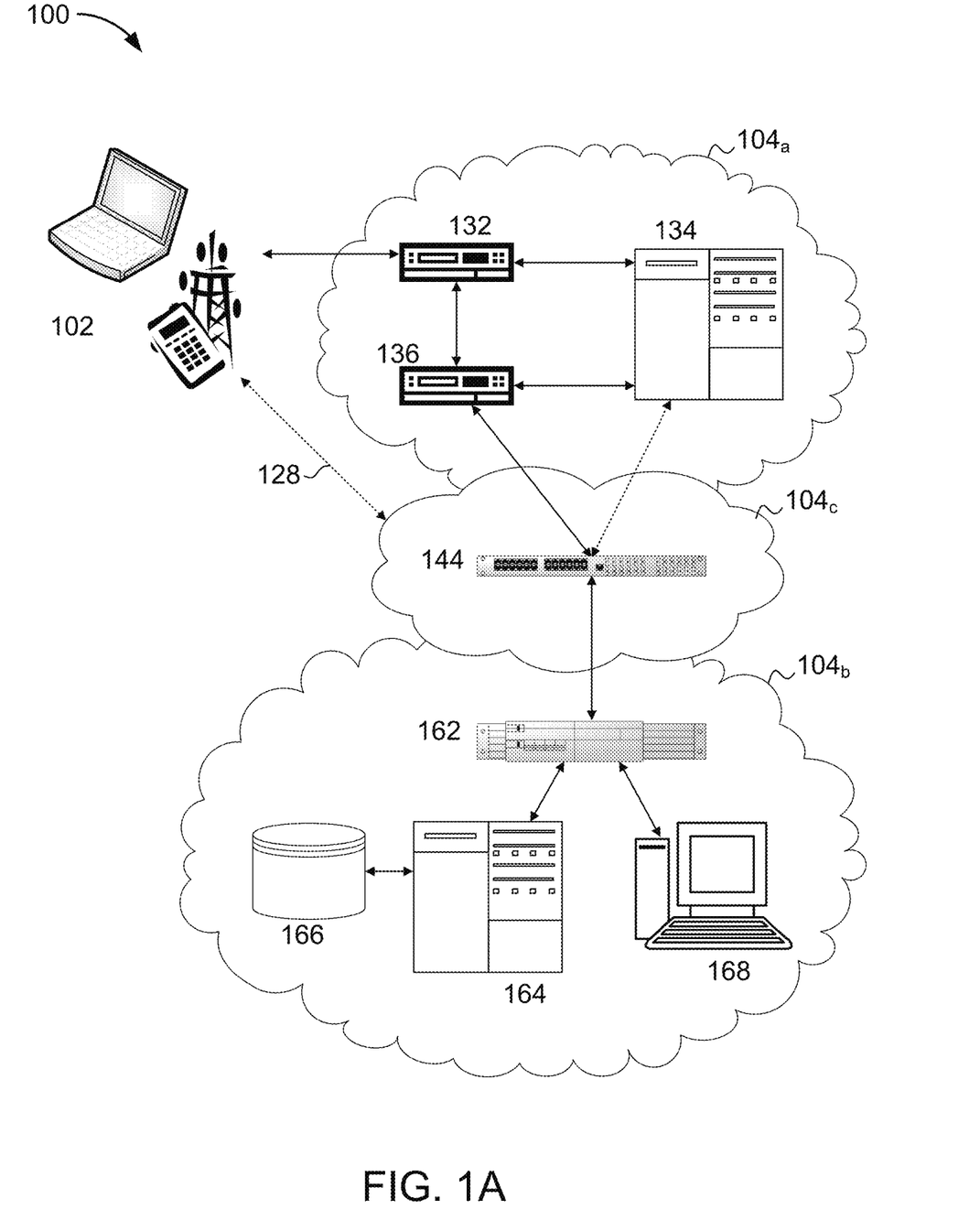
FIG. 1A is a block diagram of an illustrative network environment, in accordance with an illustrative embodiment.

FIG. 1A depicts an illustrative network environment 100. The network environment 100 includes a production network 104$_a$, a developer network 104$_b$, and one or more other networks such as a transit network 104$_c$ (the networks 104$_a$, 104$_b$, and 104$_c$ are referred to generally as networks 104). Within the network environment 100, client devices 102 communicate with servers 134, and the servers 134 provide one or more network services to the client devices 102. As shown in FIG. 1A, servers 134 are situated in the production network 104$_a$. The client devices 102 may communicate with the servers 134 directly through the production network 104$_a$ or through some intermediary network, e.g., the transit network 104$_c$. Network communications between the client devices 102 and the servers 134 flow through network devices 144 such as switches, routers, hubs, filters, firewalls, gateways, and so forth. The production network 104$_a$ includes a gateway 132 that directs traffic from client devices 102 to the servers 134. The host network 104$_a$ also includes a distributor 136, which is a network device that acts as a redirection agent or proxy. The distributor 136, can redirect traffic 128 from a client device 102 to another network 104 such as the developer network 104$_b$, e.g., via a transit network 104c. One or more network devices 144 in the transit network 104c propagate the communication to a gateway device 162 in the other network 104$_b$, which may filter communications or otherwise control access to the network 104$_b$. As shown in FIG. 1A, the developer network 104$_b$ may include a local server 164 and/or a local workstation 168. The local server 164 is shown with access to a data storage 166, e.g., a local database system.

Suitable examples of client devices 102 include various processor-based devices that execute instructions for interactions with servers 134 via a network 104. Some example client devices 102 receive input from a user and present output to the user. The client device 102 may be any kind of computing device, including, for example, a desktop computer, a laptop or notepad computer, a thin client, a mobile device such as a tablet or electronic "pad," a smart phone or data phone, a gaming system, or any other device capable of the functions described herein. The client devices 102 are capable of exchanging information with other computing devices via the network 104. For example, a client device 102 may exchange information over the network 104 using protocols in accordance with the Open Systems Interconnection ("OSI") layers, e.g., using an OSI layer-4 transport protocol such as the User Datagram Protocol ("UDP") or the Transmission Control Protocol ("TCP"), layered over an OSI layer-3 network protocol such as Internet Protocol ("IP"), e.g., IPv4 or IPv6. In some embodiments, the client device 102 supports network communication using Secure Socket Layer ("SSL") or Transport Layer Security ("TLS"), which encrypts communications layered over a reliable transport protocol (such as TCP). In some embodiments, the client device 102 is a thin-client, or functions as a thin-client, executing a thin-client protocol or remote-display protocol such as the Independent Computing Architecture ("ICA") protocol created by Citrix Systems, Inc. of Fort Lauderdale, Fla. The ICA protocol allows presentation at the client device 102 of software executing remotely (e.g., at a server 134), as though the remotely executed software were executed locally on the client device 102. In some embodiments, one or more of the servers 134 with which the client devices 102 communicate supports a custom instruction set, e.g., an application programming interface ("API"), and a custom application executed on the client device 102 implements the API. An application can implement an API using, for example, a library such as a dynamic link library ("DLL") or a software development kit ("SDK") provided to the application's developer.

Figure 1B:
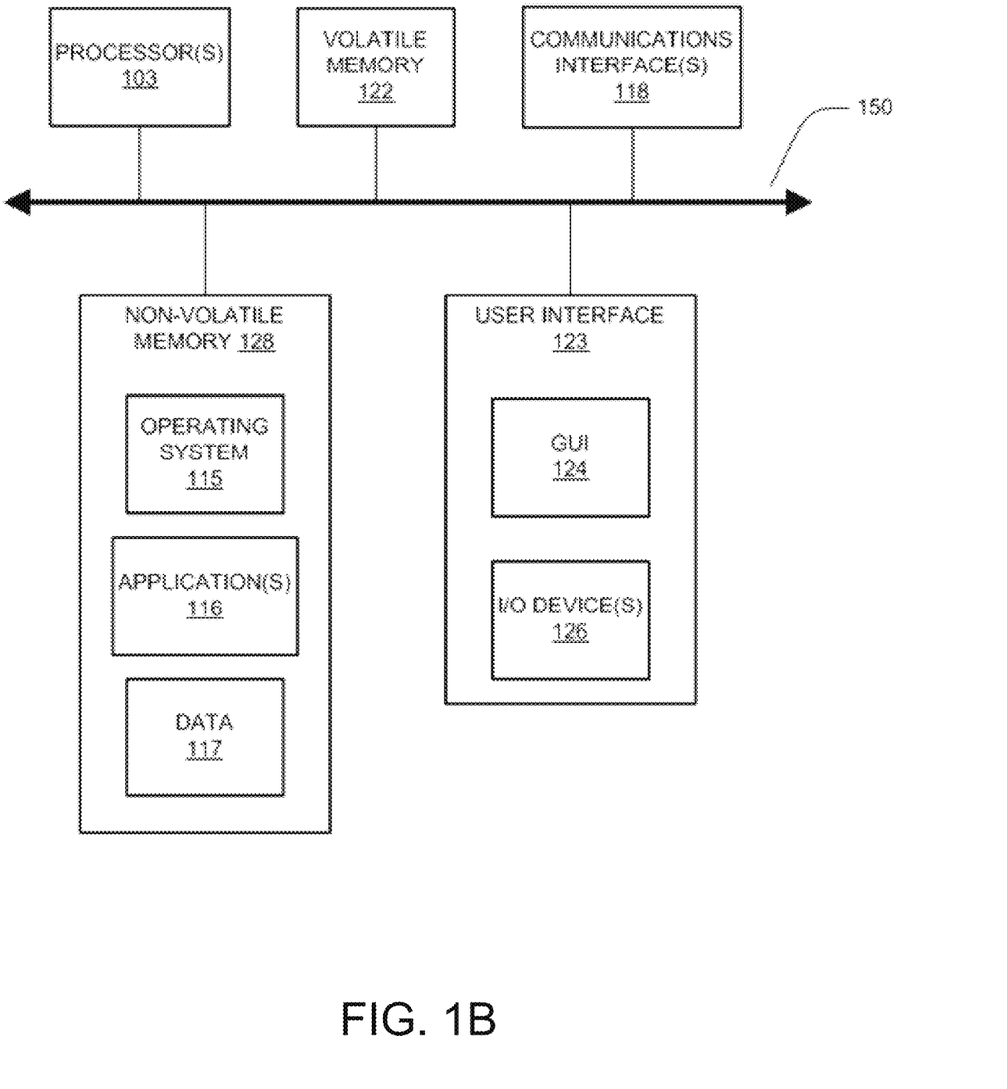
FIG. 1B is a block diagram of an example computing device, in accordance with an illustrative embodiment.

In some embodiments, the client device 102 includes one or more hardware elements for facilitating data input and data presentation. In some embodiments, the client device 102 is implemented using special purpose logic circuitry, e.g., an application specific integrated circuit ("ASIC"). In some embodiments, the client device 102 is implemented using a system on a chip ("SoC") semiconductor device that includes at least one processor (or microprocessor) core. In some embodiments, the client device 102 is implemented using a general purpose computing processor. FIG. 1B, described in more detail below, illustrates a computing device 101 that, in some configurations, is suitable for use as a client device 102.

The networks 104$_a$, 104$_b$, and 104c (referred to generally as a network 104) link devices for communication. In some embodiments, data flows through the network 104 as a flow of data packets in accordance with the OSI layers, e.g., as a TCP or ICA flow. An illustrative network 104 is the Internet; however, other networks may be used. Each network 104 may be an autonomous system ("AS"), i.e., a network that is operated under a consistent unified routing policy (or at least appears to from outside the AS network) and is generally managed by a single administrative entity (e.g., a system operator, administrator, or administrative group). A network 104 may be composed of multiple connected sub-networks or AS networks. Networks meet at boundary nodes, e.g., network devices 144 such as gateway nodes or routers. A network 104 may include wired links, optical links, and/or radio links. A network 104 may include a telephony network, including, for example, a wireless telephony network implementing a wireless communication protocol such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol. The network 104 may be public, private, or a combination of public and private networks. Each network 104 may be any type and/or form of data network and/or communication network.

The network devices 144 are network nodes that forward network data (e.g., data packets) between other network nodes. Suitable examples of network devices 144 include switches, routers, hubs, multi-homed computing devices, or any other device used for network communications. A network device 144 may include two or more network interfaces (or physical "ports," which should not be confused with transport protocol ports) and logic circuitry for identifying, for particular data, an egress interface connected to another device that will move the particular data towards a destination. In some embodiments, the network devices 144 direct traffic based on routing configuration data to forward data towards traffic destinations. In some embodiments, the network devices 144 forward data according to routing tables. In some embodiments, the network devices 144 forward data according to a configuration, e.g., a configuration set by a software defined network ("SDN") controller. In some embodiments, a network device 144 includes a content-addressable memory ("CAM") or ternary content-addressable memory ("TCAM"), used in identifying egress interfaces for routing data. In some embodiments, a network device 144 implements additional network functionality, or directs traffic through additional network nodes providing network functionality. For example, a network device 144 may pass traffic through a firewall, a network address translator ("NAT"), a network filter, or some other node providing network functionality.

One or more servers 134 may be logically grouped (e.g., as a server farm), and may either be geographically co-located (e.g., on premises) or geographically dispersed (e.g., cloud based) from client devices 102 and/or other servers 134. In some embodiments, a server 134 or group of servers 134 executes one or more applications on behalf of one or more of client devices 102 (e.g., as an application server). In some embodiments, the servers 134 provide functionality such as, but not limited to, file server, gateway server, proxy server, or other similar server functions. In some embodiments, client devices 102 may seek access to hosted applications on servers 134. In some embodiments, a network device such as the gateway 132 or specific servers 134 may provide load balancing across multiple servers 134 to process requests from client devices 102, act as a proxy or access server to provide access to the one or more servers 134, provide security and/or act as a firewall between a client 102 and a server 134, provide Domain Name Service ("DNS") resolution, provide one or more virtual servers or virtual internet protocol servers, and/or provide a secure virtual private network ("VPN") connection from a client 102 to a server 138, such as a secure socket layer ("SSL") VPN connection and/or provide encryption and decryption operations.

In described embodiments, client devices 102, servers 134, and other devices shown in FIG. 1A may be deployed as (or executed on) any type and form of computing device, such as any desktop computer, laptop computer, or mobile device capable of communication over at least one network and performing the operations described herein. For example, the client devices 102, servers 134, and other devices may each correspond to one computer, a plurality of computers, or a network of distributed computers such as the computing device 101 shown in FIG. 1B.

As shown in FIG. 1B, a computing device 101 may include one or more processors 103, volatile memory 122 (e.g., RAM), non-volatile memory 128, user interface (UI) 123, one or more communications interfaces 118 (e.g., a network interface card ("NIC")), and a communication bus 150. The user interface 123 may include hardware for a graphical user interface ("GUI") 124 (e.g., a touchscreen, a display, etc.), one or more input/output ("I/O") devices 126 (e.g., a mouse, a keyboard, a speaker, etc.). Non-volatile memory 128 stores an operating system 115, one or more applications 116, and data 117 such that, for example, computer instructions of operating system 115 and/or applications 116 are executed by processor(s) 103 out of volatile memory 122. Data 117 may be entered using an input device of GUI 124 or received from I/O device(s) 126. Various elements of the computing device 101 may communicate via communication bus 150. The computing device 101 as shown in FIG. 1B is shown merely as an example, as client devices 102, servers 138, and other network devices may be implemented by any computing or processing environment and with any type of machine or set of machines that may have suitable hardware and/or software capable of operating as described herein.

The processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more of an application specific integrated circuit ("ASIC"), microprocessor, digital signal processor, microcontroller, field programmable gate array ("FPGA"), programmable logic arrays ("PLA"), multi-core processor, or general-purpose computer processor with associated memory. The "processor" may be analog, digital, or mixed-signal. In some embodiments, the "processor" may be one or more physical processors or one or more "virtual" (e.g., remotely located or cloud-based) processors.

The communications interface 118 may include one or more interfaces to enable the computing device 101 to access a computer network 104 such as a LAN, a WAN, or the Internet through a variety of wired and/or wireless or cellular connections. In some embodiments, the communications interface 118 includes one or more network connection points (ports) and an interface controller. Network connection points may be wired connection points (e.g., Ethernet ports) or wireless (e.g., radio circuitry for Wi-Fi or mobile network communications).

The non-volatile memory 128 may include one or more of a hard disk drive ("HDD"), solid state drive ("SSD") such as a Flash drive or other solid state storage media, or other magnetic, optical, circuit, or hybrid-type storage media. In some embodiments, the non-volatile memory 128 includes read-only memory ("ROM"). In some embodiments, storage may be virtualized, e.g., using one or more virtual storage volumes, such as a cloud storage, or a combination of such physical storage volumes and virtual storage volumes.

In described embodiments, a first computing device 101 (e.g., a server 134) may execute an application on behalf of a user of a second computing device 101 (e.g., a client device 102). For example, the first computing device may execute a virtual machine providing an execution session within which applications execute on behalf of a user of the second computing device. For example, the first computing device may provide a hosted desktop session, may execute a terminal services session to provide a hosted desktop environment, or may provide access to a computing environment including one or more of: one or more applications, one or more desktop applications, and one or more desktop sessions in which one or more applications may execute. For example, in some embodiments, the client device 102 is a thin-client, or functions as a thin-client, executing a thin-client protocol or remote-display protocol such as the Independent Computing Architecture ("ICA") protocol created by Citrix Systems, Inc. of Fort Lauderdale, Fla.

Figure 2:
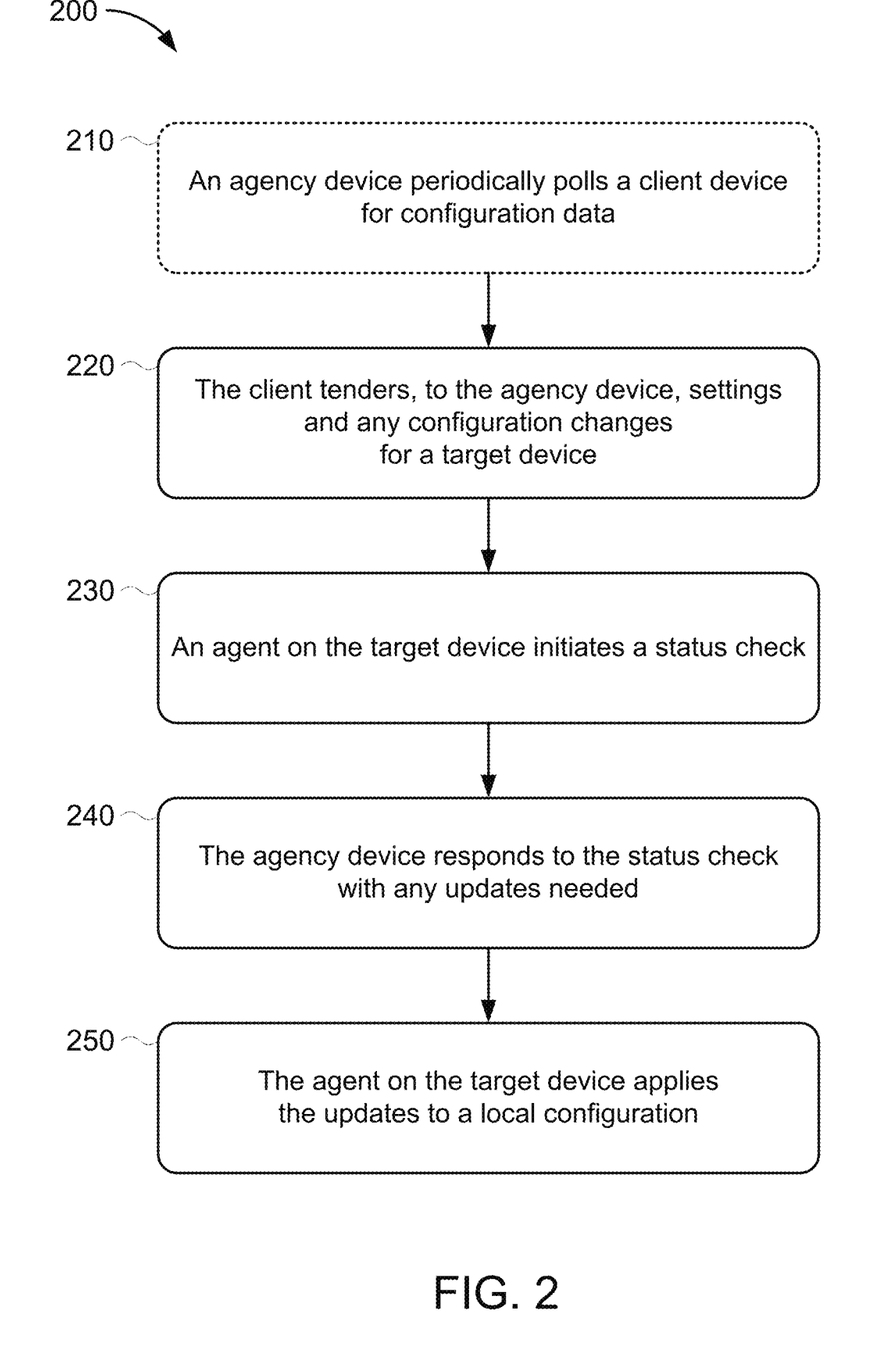
FIG. 2 is a flowchart for a method by which a registry modification request from a client is effected at a target computing device via an intermediary agent.
Figure 3:
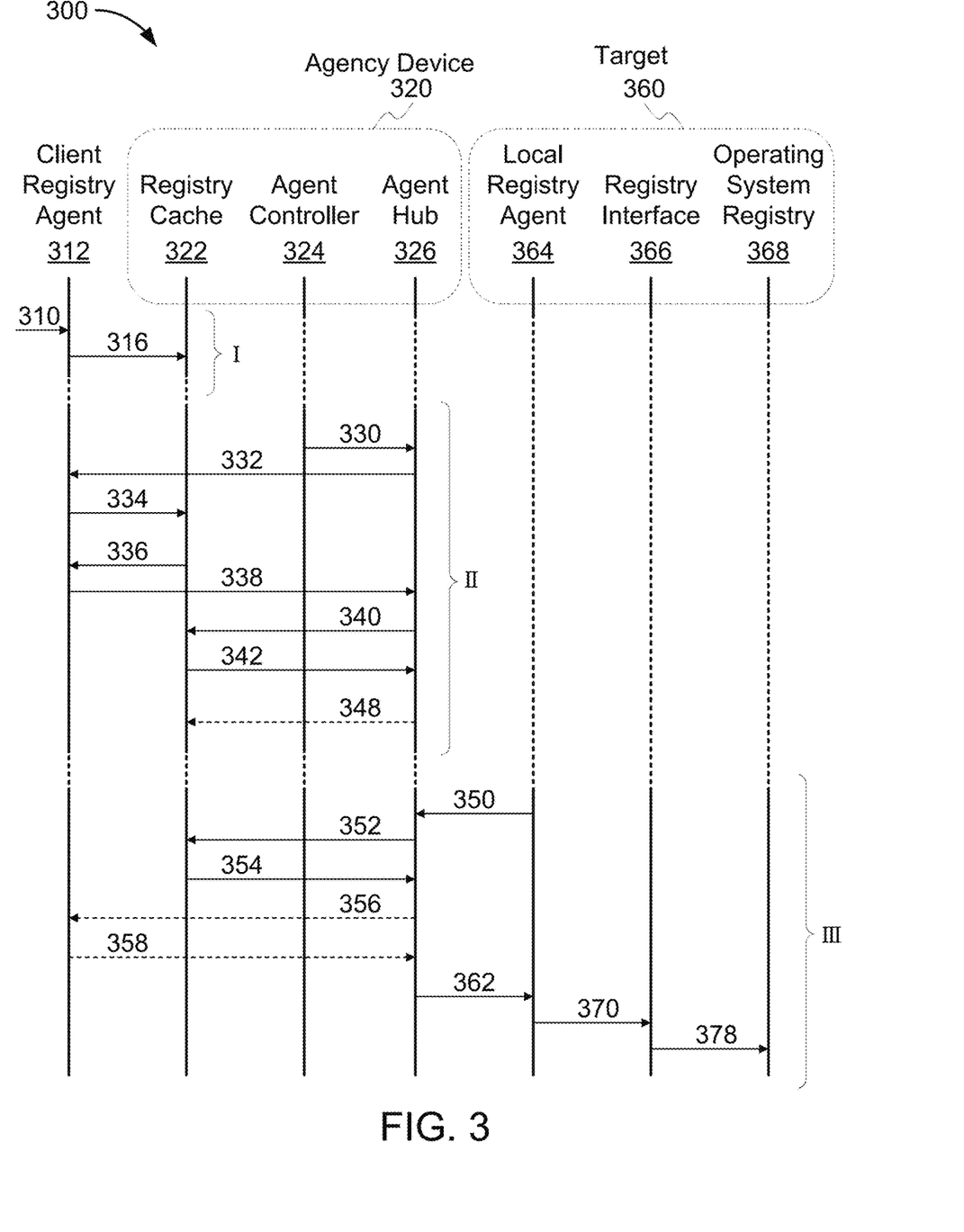
FIG. 3 is a sequence diagram illustrating interactions for stateless modification of operating system registry data across network boundaries.
Figure 4:
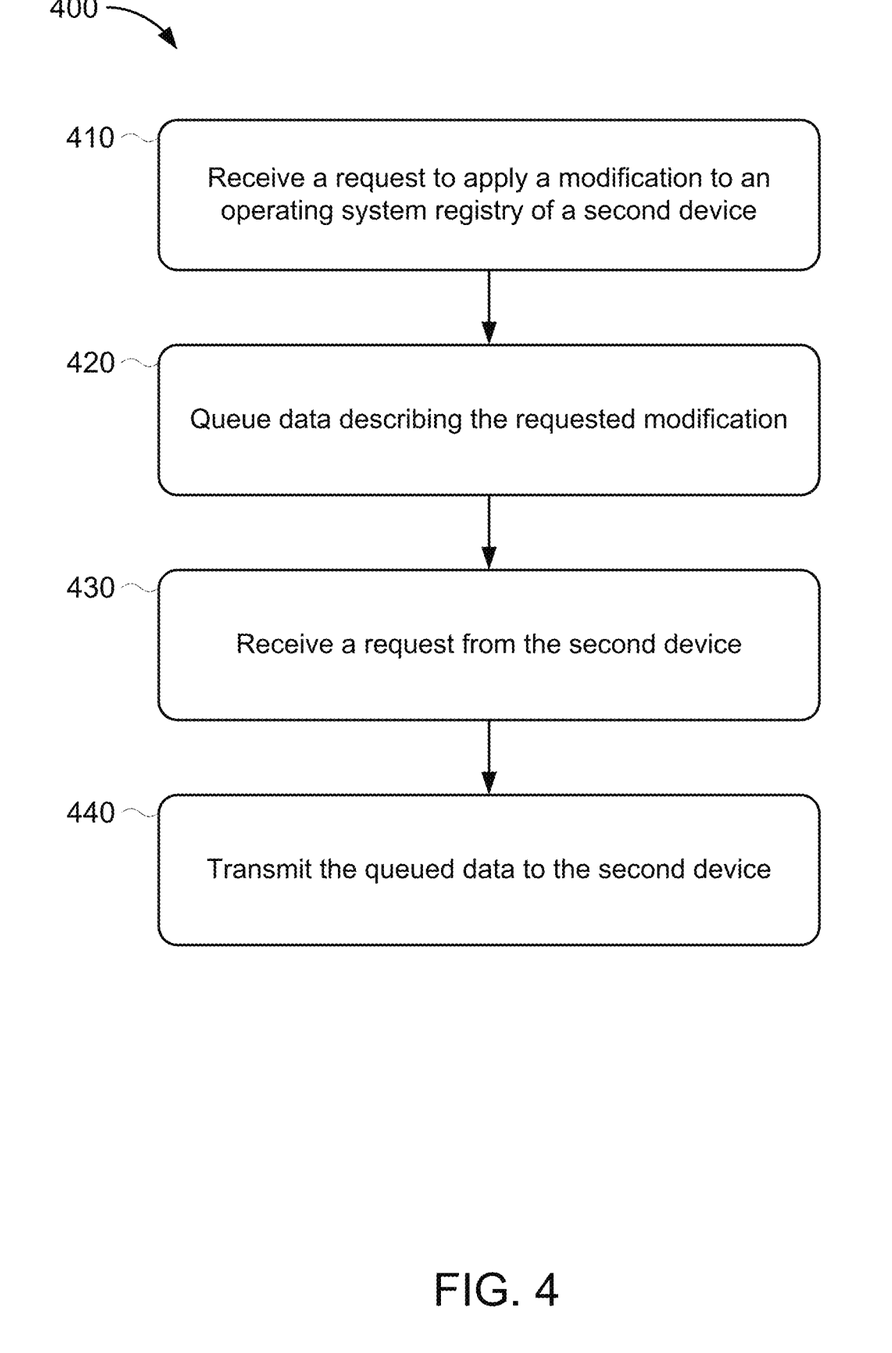
FIG. 4 is a flowchart for a method of managing stateless modification of operating system registry data across network boundaries.

The computing device 101 may include an operating system level or similar secured configuration manger, such as the Microsoft Windows registry. The configuration manager may include an application programming interface ("API") supporting instructions such as creating a new setting, populating a new setting with a value, changing or modifying a setting (or setting value), and removing a setting. For example, the Windows registry provides API functions that include (among others):

RegCreateKeyEx
RegOpenKeyEx
RegCloseKey
RegDeleteKey
RegSetKeyValue
RegSetValueEx
RegCopyTree
RegDeleteTree
RegDeleteValue
RegEnumKeyEx
RegEnumValue In some embodiments, a computing device 101 runs a Microsoft Windows type operating system that includes a registry. For example, in some embodiments, the workstation 168 shown in FIG. 1A (in a network $104_b$) runs a Microsoft Windows type operating system that includes a registry. As another example, in some embodiments, the server 164 shown in FIG. 1A (in the network $104_b$) hosts a virtual machine or remote desktop application that runs a Microsoft Windows type operating system that includes a registry. The registry of the computing device 101 (in the network $104_b$) can be modified remotely, from another computing device 101 such as a client 102, which is not in the network $104_b$. FIG. 2 is a flowchart for a method 200 by which a registry modification request from a client is effected at a target computing device via an intermediary agent. FIG. 3 is a sequence diagram illustrating interactions 300 for stateless modification of operating system registry data across network boundaries. FIG. 4 is a flowchart for a method 400 of managing stateless modification of operating system registry data across network boundaries. In some embodiments, a cloud-based agent hub (e.g., at a server 134 or network device 136 in network $104_a$, as shown in FIG. 1A) implements the method 400.

FIG. 2 is a flowchart for a method 200 by which a registry modification request from a client is effected at a target computing device via an intermediary agent. In brief overview of the method 200, at stage 210, an agency device periodically polls a client device for configuration data. At stage 220, the client tenders, to the agency device settings and any configuration changes for a target device. At stage 230, an agent on the target device initiates a status check. That is, the agent on the target device initiates a communication to the agency device to determine whether there are any updates. At stage 240, the agency device responds to the status check with any updates needed and, at stage 250, the agent on the target device applies the updates to a local configuration (e.g., to the registry).

Referring to FIG. 2 in more detail, at stage 210, an agency device periodically polls a client device for configuration data. In some embodiments, the agency device is cloud-based and provides the client device one or more services. The client device may be connected to the cloud-based agency device for access to the one or more services, including, but not limited to, for access to a configuration utility for modifying or managing the operating system registry on a target device.

At stage 220, the client tenders, to the agency device settings and any configuration changes for a target device. Some embodiments may omit stage 210; in some other embodiments, stage 220 may be responsive to stage 210. In some embodiments, stage 220 may occur before stage 210, such that the client initiates a transaction for submitting registry modifications to the agency device. In some embodiments, the agency device authenticates the client, e.g., determining that the client is authorized to make changes to the target device. In some embodiments, the client device provides authentication credentials matching to an entity authorized to make changes.

At stage 230, an agent on the target device initiates a status check. That is, the agent on the target device initiates a communication to the agency device to determine whether there are any updates. In some embodiments, the agency device is in a separate autonomous system ("AS") network from the target device. There may be security measures in place (such as a firewall) that require the target device to initiate communications with the agency device in the cloud. In some embodiments, the agency device is in a virtual network (e.g., a virtual private network ("VPN") that crosses AS boundaries). In some embodiments, the agency device notifies the target device that registry updates are available.

At stage 240, the agency device responds to the status check with any updates needed. In some embodiments, the agency device pulls together disparate descriptions of the settings, e.g., from one or more client devices (e.g., customer devices) and server-side repositories or caches of update requests. The agency device may need to resolve conflicts between modifications that arrived from different sources. The agency device may compare the update requests to a known state of the target operating system registry (e.g., as stored in a server-side cache). For example, the agency device may maintain a "shadow registry" for the target system, the shadow registry replicating the settings and state of the registry at the target system. In some embodiments, the agency device applies requested modifications to the shadow registry and determines, based on a comparison of the shadow registry to a state of the operating system registry cached by the agency device, a set of change instructions transitioning the cached state to match the shadow registry. In some embodiments, the agency device responds to the status check with a set of modifications to be applied. In some embodiments, the agency device responds to the status check with a desired end state for the registry (such that the agent on the target device can determine what modifications need to be made to effect the requested end state).

At stage 250, the agent on the target device applies the updates to a local configuration (e.g., to the registry). In some embodiments, the agent on the target device uses an application programming interface ("API") to interact with the operating system registry. The requested modifications may include, for example, a create key request, a create value request, a delete key request, and/or a delete value request. In some embodiments, the agent on the target device identifies, from data provided by the agency device, what changes need to be made to the operating system registry. In some embodiments, the agent on the target device verifies that, when the changes have been applied, the operating system registry will be in a stable state (e.g., not corrupted by the changes). This verification may be performed prior to applying the updates. In some embodiments, the agent on the target device validates authentication information from the agency device, proving that the source of the requested changes was authenticated and had authorization to make the changes.

FIG. 3 is a sequence diagram illustrating interactions 300 for stateless modification of operating system registry data across network boundaries. In FIG. 3, a client registry agent 312 interacts with an agency device 320 providing a registry cache 322, an agent controller 324, and an agent hub 326. The registry cache 322 is a data storage for holding update data, which may arrive from multiple clients. The agent controller 324 is a core worker element, e.g., a daemon that activates the agent hub 326 periodically to refresh the registry cache 322. As introduced in FIG. 2, the agency device 320 is an intermediary that facilitates modifications to the operating system registry 368 of a target 360. The target 360 hosts a local registry agent 364 (for communication with the agency device) and a registry interface 366 (for interaction with the registry 368). The interactions 300 shown in FIG. 3 are grouped into three sets, labeled "I", "II", and "III".

The set "I" of interactions 300 includes an interaction 310, between an request source (not shown) and the client registry agent 312. The request source may be, for example, an end user, an application, a monitoring system, a mirror system, or any other possible source of a request to modify a registry. For example, an application executing at a client device 120 (or a user of the client device 120) may submit a request to create a registry key, populate a value, change a value, delete a key, etc. In interaction 310, the client registry agent 312 receives a modification request from the request source. The client registry agent 312 may be collocated with the request source. The client registry agent 312 submits the modification request to an agency device 320, which may be cloud-based. The set "I" of interactions 300 includes an interaction 316 between the client registry agent 312 and the agency device 320. In interaction 316, the registry cache 322 receives update data from the client registry agent 312, e.g., from the modification request. In one example, interaction 310 is a "Set Value" message and interaction 316 is a "Save value to Registry Customer Settings" message.

The set "II" of interactions 300 occurs periodically, e.g., at five minute intervals. In some embodiments, the agent controller 324 initiates the set "II" of interactions 300 according to a schedule, e.g., at set times, at configurable times, at regular intervals, at dynamic intervals varied according to change rates, etc. The set "II" of interactions 300 begins with the agent controller 324 calling on the agent hub 326 to process messages from one or more client devices. In interaction 332, the agent hub 326 sends a refresh request (e.g., "Get All Customer Settings") to the client registry agent 312. In interaction 334, the client registry agent 312 checks the registry cache 322 for updates (e.g., updates from other clients modifying the same registry 368) and, in interaction 336, the registry cache 322 responds with any such updates. After receiving any updates in interaction 336, the client registry agent 312 returns all settings information to the agent hub 326 in interaction 338. In some embodiments, in interaction 340, the agent hub 326 sends a data request to the registry cache 322 and, in interaction 342, the registry cache 322 responds to the agent hub 326. For example, the agent hub 326 may poll the registry cache 322 for any information not supplied by the client registry agent 312. In some embodiments the request in interaction 340 is a request for edge server data. In some embodiments, the agent hub 326 merges together all registry data received in interactions 338 and 342 and resolves any conflicts between contemporary modifications (e.g., modifications submitted by different distributed client registry agents 312). For example, the agent hub 326 may use a set of prioritization rules, a strict ordering of operations (e.g., using Lamport timestamps or vector clocks), or any other mechanism for resolving conflicts. In some embodiments, modification requests are stored in a first-in/first-out ("FIFO") queue and applied in the same order they are received. If the new configuration data requires place holder data or a configuration of the registry cache 322, then, in interaction 348, the agent hub 326 sends instructions to the registry cache 322 to make the necessary place holder or configuration.

In at least one example, interaction 330 is a "Process Messages per Customer" message; interaction 332 is a "Get All Customer Settings" message; interaction 334 is a "Get All Settings for Customer" message; interaction 336 is an "All Customer Settings" message; interaction 338 is a "Return All Settings for Customer" message; interaction 340 is a "Get Edge Servers" message; and interaction 342 is a "Return Edge Servers" message. In at least one example, if there are new configuration items, the interaction 348 is a "Create Placeholder Config" message, and the registry is called again when the latest configuration values are available.

In some embodiments, by the conclusion of the set "II" of interactions 300, the agent hub 326 has constructed a state of the registry. However, the interactions can be stateless. In particular, in some embodiments, the interaction 338 provides the agent hub 326 with a comprehensive view of the registry as perceived by the client registry agent 312. The entire state is passed, such that the agent hub 326 can proceed even if no information were available in the registry cache 322.

The set "III" of interactions 300 begins, in interaction 350, with a request from a local registry agent 364 at the target device 360 to the agent hub 326 to update the operating system registry 368 of the target device 360. In some embodiments, the request in interaction 350 is a periodic polling request (e.g., an hourly or daily update request). In some embodiments, the request in interaction 350 is responsive to an external factor, such as a device restart or an out-of-band message from a client device 102. Because the request originates at the target 360, any firewall between the target 360 and the agency device 320 (which may be cloud-based) is pierced. Accordingly, no network administrative customizations are needed to allow this request. In interaction 350, the agent hub 326 requests data from the registry cache 322 and, in interaction 354, the registry cache 322 responds to the agent hub 326. In some instances, in interaction 356, the agent hub 326 may send a settings request to the client registry agent 312 and receive, in interaction 358, settings from the client registry agent 312 in response. In some embodiments, the agent hub 326 then merges together all registry data received in interactions 354 and 358 and resolves any conflicts between contemporary modifications (e.g., as described above in reference to interaction group II.) The agent hub 326 then, in interaction 362, returns data to the to the local registry agent 364.

The local registry agent 364, which is local to the target 360, can then apply any modifications needed to the operating system registry 368, e.g., via the registry interface 366. In some embodiments, in interaction 370, the local registry agent 364 sends a modification request to the registry interface 366 and, in interaction 378, the registry interface 366 applies the requested modification to the operating system registry 368. For example, in some embodiments, the registry interface 366 is an application programming interface ("API") supporting instructions such as creating a new setting, populating a new setting with a value, changing or modifying a setting (or setting value), and removing a setting. For example, the Windows registry provides API functions that include (among others):

RegCreateKeyEx
RegOpenKeyEx
RegCloseKey
RegDeleteKey
RegSetKeyValue
RegSetValueEx
RegCopyTree
RegDeleteTree
RegDeleteValue
RegEnumKeyEx
RegEnumValue In at least one example, interaction 350 is a "Get Edge Server Messages" message from the local registry agent 364 to the agent hub 326; interaction 352 is a "Get Edge Server Messages" message from the agent hub 326 to the registry cache 322; interaction 354 is a "Return Edge Server Messages" message. If send-able, interaction 356 is a "get settings for customer" message and interaction 358 is a "return all settings for customer" message. In at least one example, interaction 362 is a "Return Edge Server Messages" message from the agent hub 326, responsive to the interaction 350 from the local registry agent 364. In at least one example, interaction 370 is a "Set Registry Value" message from the local registry agent 364 to the registry interface 366 and interaction 378 is a "Set Registry Value" message from the registry interface 366 to the operating system registry 368 itself. In some embodiments, the registry interface 366 is linked, or otherwise incorporated, in to the local registry agent 364 such that the interactions 370 and 378 are combined into a direct interaction between the local registry agent 364 and the operating system registry 368.

FIG. 4 is a flowchart for a method 400 of managing stateless modification of operating system registry data across network boundaries. In broad overview of the method 400, at stage 410, a cloud-based agent receives a request to apply a modification an operating system registry of a second device (e.g., a target device in another network). At stage 420, the agent queues data describing the requested modification. At stage 430, the agent receives a request from the second device (i.e., the target device) and, in response, at stage 440, the agent transmits the queued data to the second device.

Referring to FIG. 4 in more detail, at stage 410, the cloud-based agent receives a request to apply a modification an operating system registry of a second device (e.g., a target device in another network). For example, in some embodiments, the request in stage 410 is the request described above in reference to interaction 316 in FIG. 3. The request may be, for example, a create key request, a create value request, a delete key request, a delete value request, or any other such modification request. In some embodiments, the request is structured as a specific modification instruction, e.g., "RegCreateKeyEx(hKey . . . )." In some embodiments, the request is structured using a custom protocol, the request corresponding to a Registry API modification instruction. In some embodiments, the request is an end-state description, e.g., a statement that a particular key should exist. The cloud-based agent or an agent at the target device then creates the particular key if it doesn't already exist. In some embodiments, the request is a comprehensive description of the registry, e.g., a complete copy of the registry as the requestor would like it to be. In some embodiments, the request is a sub-set of a comprehensive description, e.g., describing only one branch or sub-branch of a registry hierarchical tree. In some embodiments, the request is compressed.

In some embodiments, the cloud-based agent authenticates a source of the request at stage 410. For example, the request may arrive during an authenticated session. In some embodiments, the request includes authentication data such as a token, a challenge response, authentication credentials, etc. In some embodiments, the cloud-based agent verifies that the source of the request is authorized to make the request. For example, in some embodiments, the cloud-based agent authenticates the source as corresponding to a particular customer account and then verifies that the particular customer account is authorized to make the modification specified in the received request.

At stage 420, the cloud-based agent queues data describing the requested modification. In some embodiments, the queue is a first-in/first-out ("FIFO") data structure. In some embodiments, the queue is a cache of received requests. In some embodiments, the cloud-based agent uses cloud-based data storage to hold the request data. In some embodiments, the queue includes timestamp data corresponding to when each received request was made and/or received. In some embodiments, the cloud-based agent maintains a shadow registry and applies each received requested modification to the shadow registry as requests arrive. In some embodiments, the shadow registry is maintained in lieu of a queue. In some embodiments, the cloud-based agent maintains a shadow registry representing a last known valid state of the target device registry, and uses the shadow to determine what changes would need to be made to effect the requested modification. The cloud-based agent then queues the determined change.

At stage 430, the cloud-based agent receives a request from the second device (i.e., the target device). For example, in some embodiments, the request in stage 430 is the request described above in reference to interaction 350 in FIG. 3. In some embodiments, the request is a request to check the state of the target device registry. In some embodiments, the request is a request for any updates to the target device registry. In some embodiments, the target device communicates with the cloud-based agent using a custom protocol, e.g., an application programming interface ("API") specific to the cloud-based agent. In some embodiments, the target device establishes a communication channel with the cloud-based agent and the cloud-based agent periodically pushes registry updates to the target device using the established communication channel. In some embodiments, the request received by the cloud-based agent at stage 430 is a "keep alive" message for the communication channel.

At stage 440, the cloud-based agent transmits the queued data to the second device. For example, in some embodiments, the transmission in stage 440 is the response described above in reference to interaction 362 in FIG. 3. In some embodiments, the cloud-based agent transmits the data stored at stage 420. In some embodiments, the cloud-based agent transmits authentication and/or authorization data to the second device. In some such embodiments, the target device validates the authentication (and/or authorization) data. The cloud-based agent may wait for confirmation from the target device prior to transmitting modification data.

In some embodiments, a cloud-based agent hub (e.g., at a server 134 or network device 136 in network 104$_a$, as shown in FIG. 1A) implements the method 400. In some embodiments, the cloud-based agent described in FIG. 4 is the agency device 320 shown in FIG. 3. In some embodiments, the cloud-based agent of FIG. 4 is distributed across multiple cloud-based servers.

The systems and methods described may be used in a variety of embodiments. For example, and without limitation:

In at least one aspect, the above describes a method for stateless modification of operating system registry data across network boundaries. The method includes receiving, by a processor within a first network, a request to apply a modification to an operating system registry of a second device within a second network different from the first network. The method includes queueing, by the processor, data describing the requested modification. The method includes receiving, by the processor, a polling request from the second device. And the method includes transmitting, by the processor to the second device responsive to the polling request, the queued data describing the requested modification for the second device to apply to the operating system registry of the second device.

In some embodiments of the method, the requested modification is one of: a create key request, a create value request, a delete key request, or a delete value request.

Some embodiments of the method include receiving, by the processor from the second device, confirmation that the second device has applied the requested modification to the operating system registry of the second device. Some embodiments of the method include authenticating, by the processor, a source of the request to modify the operating system registry of the second device; and transmitting, by the processor to the second device, data representing authenticity of the source of the request. Some embodiments of the method include verifying, by the processor, that the source of the request is authorized to make the request.

Some embodiments of the method include receiving, by the processor, one or more requests to apply a plurality of modifications to the operating system registry of the second device; queueing, by the processor, data describing the plurality of requested modifications; and transmitting, by the processor to the second device responsive to the polling request, the queued data describing the plurality of requested modifications.

Some embodiments of the method include sending, by the processor, a response to the request to apply the modification, and receiving, by the processor, responsive to the response to the request to apply the modification, a dataset representing a modified state of the operating system registry. In some such embodiments, the data describing the requested modification includes the dataset.

Some embodiments of the method include sending, by the processor, a response to the request to apply the modification; receiving, by the processor, responsive to the response to the request to apply the modification, a dataset representing a modified state of the operating system registry; and determining, by the processor, based on a comparison of the modified state of the operating system registry to a state of the operating system registry cached by the processor, a set of change instructions transitioning the cached state to the modified state. In some such embodiments, the dataset describing the requested modification includes the set of change instructions.

In some embodiments, the method includes maintaining, by the processor, a shadow registry. In some such embodiments, the method includes applying, by the processor, the requested modification to the shadow registry, and determining, by the processor, based on a comparison of the shadow registry to a state of the operating system registry cached by the processor, a set of change instructions transitioning the cached state to match the shadow registry. In some such embodiments, the dataset describing the requested modification includes the set of change instructions.

In some embodiments, the method includes providing, by the processor, a first service listening for the request to apply the modification and a second service listening for the polling request from the second device. In some such embodiments, the method includes exchanging data between the first service and the second service.

In at least one aspect, these methods may be encoded as computer-readable instructions for execution by one or more processors. The computer-readable instructions can be encoded on non-transitory computer-readable media.

In at least one aspect, the above describes a system for stateless modification of operating system registry data across network boundaries. The system includes a processor coupled to memory and configured to execute instructions to receive, within a first network, a request to apply a modification to an operating system registry of a second device within a second network different from the first network. The processor is configured to execute instructions to queue data describing the requested modification, receive a polling request from the second device, and transmit, to the second device responsive to the polling request, the queued data describing the requested modification for the second device to apply to the operating system registry of the second device.

In some embodiments of the system, the requested modification is one of: a create key request, a create value request, a delete key request, or a delete value request.

In some embodiments of the system, the processor is configured to receive, from the second device, confirmation that the second device has applied the requested modification to the operating system registry of the second device. In some embodiments of the system, the processor is configured to authenticate a source of the request to modify the operating system registry of the second device; and transmit, to the second device, data representing authenticity of the source of the request. In some embodiments of the system, the processor is configured to verify that the source of the request is authorized to make the request.

In some embodiments of the system, the processor is configured to receive one or more requests to apply a plurality of modifications to the operating system registry of the second device; queue data describing the plurality of requested modifications; and transmit, to the second device responsive to the polling request, the queued data describing the plurality of requested modifications.

In some embodiments of the system, the processor is configured to send a response to the request to apply the modification, and receive, responsive to the response to the request to apply the modification, a dataset representing a modified state of the operating system registry. In some such embodiments, the data describing the requested modification includes the dataset.

In some embodiments of the system, the processor is configured to send a response to the request to apply the modification; receive, responsive to the response to the request to apply the modification, a dataset representing a modified state of the operating system registry; and determine, based on a comparison of the modified state of the operating system registry to a state of the operating system registry cached by the system, a set of change instructions transitioning the cached state to the modified state. In some such embodiments, the dataset describing the requested modification includes the set of change instructions.

In some embodiments of the system, the processor is configured to maintain a shadow registry. In some such embodiments, the processor is configured to apply the requested modification to the shadow registry, and determine, based on a comparison of the shadow registry to a state of the operating system registry cached by the processor, a set of change instructions transitioning the cached state to match the shadow registry. In some such embodiments, the dataset describing the requested modification includes the set of change instructions.

In some embodiments of the system, the processor is configured to provide a first service listening for the request to apply the modification and a second service listening for the polling request from the second device. In some such embodiments, the processor is configured to exchange data between the first service and the second service.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method for stateless modification of operating system registry data across network boundaries, the method comprising:
   receiving, by a first device having one or more processors within a first network, a first request to apply modifications to an operating system registry to transition from a first state to a second state, the operating system registry comprising one or more settings for an operating system of a second device within a second network different from the first network, the operating system registry of the second device configured to be modified locally from within the second network;
   maintaining, by the first device, in a queue, a dataset representing the modifications to apply to the operating system registry of the second device;
   receiving, by the first device on the first network, a second request from the second device on the second network to retrieve the modifications of the first request received by the first device to apply to the operating system registry of the second device from within the second network;
   transmitting, by the first device to the second device responsive to the second request, authentication information to cause the second device to authenticate the first device to permit modification of the operating system registry for the operating system of the second device from the first device; and
   transmitting, by the first device responsive to the authentication of the first device, the dataset from the queue to cause the second device to apply, in order of receipt by the queue, the modifications to the one or more settings of the operating system registry for the operating system of the second device to transition from the first state to the second state.

2. The method of claim 1, further comprising receiving, by the first device from the second device, confirmation that the second device has applied the requested modifications to the operating system registry of the second device.

3. The method of claim 1, further comprising:
   receiving, by the first device, one or more requests to apply a sequence of modifications to the operating system registry of the second device;
   queueing, by the first device, the one or more requests corresponding to the sequence of modifications; and
   transmitting, by the first device to the second device responsive to the second request, the dataset corresponding to the sequence of requested modifications to apply to the operating system registry of the second device in accordance with the sequence of modifications corresponding to the queued data.

4. The method of claim 1, wherein the modifications include one or more of: a create key request, a create value request, a delete key request, or a delete value request.

5. The method of claim 1, the method further comprising:
   sending, by the first device, a response to the first request to apply the modifications; and
   receiving, by the first device, responsive to the response to the first request to apply the modifications, a dataset representing the second state of the operating system registry; and
   wherein the data corresponding to the modifications includes the dataset.

6. The method of claim 1, the method further comprising:
   sending, by the first device, a response to the first request to apply the modifications;
   receiving, by the first device, responsive to the response to the first request to apply the modifications, a dataset representing the second state of the operating system registry; and
   determining, by the first device, based on a comparison of the second state of the operating system registry to the first state of the operating system registry, a set of change instructions transitioning the first state to the second state; and
   wherein the dataset corresponding to the modifications include the set of change instructions.

7. The method of claim 1, the method further comprising:
   maintaining, by the first device, a shadow registry;
   applying, by the first device, the modifications to the shadow registry; and
   determining, by the first device, based on a comparison of the shadow registry to the first state of the operating system registry cached by the processor, a set of change instructions transitioning the second state to match the shadow registry; and wherein the dataset corresponding to the modifications includes the set of change instructions.

8. The method of claim 1, the method further comprising:
authenticating, by the first device, a source of the first request to modify the operating system registry of the second device; and
transmitting, by the first device to the source, data representing authenticity of the source of the request.

9. The method of claim 8, the method further comprising:
establishing, by the first device, over the first network and the second network, a communication session with the second device to receive the second request to retrieve the the modifications of the first request from a source, the source of the first request authorized to make the first request.

10. The method of claim 1, the method further comprising:
providing, by the first device, a first service listening for the first request to apply the modifications;
providing, by the first device, a second service listening for the second request from the second device; and
exchanging the dataset between the first service and the second service via a gateway between the first network and the second network.

11. A system for stateless modification of operating system registry data across network boundaries, comprising:
a first device in a first network, the first device having one or more processors configured to:
receive a first request to apply modifications to an operating system registry to transition from a first state to a second state, the operating system registry comprising one or more settings for an operating system of a second device within a second network different from the first network, the operating system registry of the second device configured to be modified locally from within the second network;
maintain, in a queue, a dataset representing the modifications to apply to the operating system registry of the second device;
receive, from the second device, a second request from the second device on the second network to retrieve the modifications of the first request received by the first device to apply to the operating system registry of the second device from within the second network;
transmit, to the second device responsive to the second request, authentication information to cause the second device to authenticate the first device to permit modification of the operating system registry for the operating system of the second device from the first device; and
transmit, responsive to the authentication of the first device, the dataset from the queue to cause the second device to apply, in order of receipt by the queue, the modifications from the queue to the one or more settings of the operating system registry for the operating system of the second device to transition from the first state to the second state.

12. The system of claim 11, wherein the first device is further configured to receive, from the second device, confirmation that the second device has applied the requested modifications to the operating system registry of the second device.

13. The system of claim 11, wherein the first device is further configured to:
receive one or more requests to apply a sequence of modifications to the operating system registry of the second device;
queue the one or more requests corresponding to the sequence of modifications; and
transmit, to the second device responsive to the second request, the dataset corresponding to the sequence of modifications to apply to the operating system registry of the second device in accordance with the sequence of modifications corresponding to the queued data.

14. The system of claim 11, wherein the modifications include one or more of: a create key request, a create value request, a delete key request, or a delete value request.

15. The system of claim 11, wherein the first device is further configured to:
send a response to the first request to apply the modifications; and
receive, responsive to the response to the first request to apply the modifications, a dataset representing the second state of the operating system registry; and
wherein the data corresponding to the modifications include the dataset.

16. The system of claim 11, wherein the first device is further configured to:
send a response to the first request to apply the modifications;
receive, responsive to the response to the first request to apply the modifications, a dataset representing the second state of the operating system registry; and
determine, based on a comparison of the second state of the operating system registry to the first state of the operating system registry, a set of change instructions transitioning the first state to the second state; and
wherein the dataset corresponding to the modifications include the set of change instructions.

17. The system of claim 11, wherein the first device is further configured to:
maintain a shadow registry;
apply the modifications to the shadow registry; and
determine, based on a comparison of the shadow registry to the first state of the operating system registry cached by the processor, a set of change instructions transitioning the second state to match the shadow registry;
wherein the dataset corresponding to the modifications includes the set of change instructions.

18. The system of claim 11, wherein the first device is further configured to:
authenticate a source of the request to modify the operating system registry of the second device; and
transmit, to the source, data representing authenticity of the source of the request.

19. The system of claim 18, wherein the first device is further configured to:
establish, over the first network and the second network, a communication session with the second device to receive the second request to retrieve the modifications of the first request from a source, the source authorized to make the first request.

20. The system of claim 11, wherein the first device is further configured to:
provide a first service listening for the first request to apply the modifications;
provide a second service listening for the second request from the second device; and exchange the dataset between the first service and the second service via a gateway between the first network and the second network.

\* \* \* \* \*